United States Patent

Mashimo et al.

[11] Patent Number: 4,604,081
[45] Date of Patent: Aug. 5, 1986

[54] TOOTHED BELT

[75] Inventors: Satoshi Mashimo, Akashi; Masayuki Tanaka; Yoshio Yamaguchi, both of Kobe; Takashi Kinoshita, Hyogo, all of Japan

[73] Assignee: Mitsuboshi Belting Ltd., Japan

[21] Appl. No.: 657,739

[22] Filed: Oct. 4, 1984

[30] Foreign Application Priority Data

Oct. 7, 1983 [JP] Japan .................. 57-188795

[51] Int. Cl.⁴ .................. F16G 1/28
[52] U.S. Cl. .................. 474/205
[58] Field of Search .......... 474/205, 266, 267, 268, 474/250, 260, 264

[56] References Cited

U.S. PATENT DOCUMENTS 4,498,891 2/1985 Mashimo et al. .......... 474/205
4,518,375 5/1985 Mashimo et al. .......... 474/205

FOREIGN PATENT DOCUMENTS 7610555 11/1976 France .................. 474/205
56-80544 7/1981 Japan .................. 474/205
59-23143 2/1984 Japan .................. 474/205

*Primary Examiner*—John M. Jillions
*Attorney, Agent, or Firm*—Wood, Dalton, Phillips, Mason & Rowe

[57] ABSTRACT

A toothed belt having a fabric adhered to the toothed portion of the belt formed of synthetic resin yarns having an ultimate viscosity of greater than approximately 1.30. In the illustrated embodiment, the yarns extending in the longitudinal direction of the belt are fully processed yarns. The cloth is preferably a woven cloth wherein one or the other of the weft and warp are wooly processed. The use of the disclosed cloth provides a substantial improvement in resistance of the belt to cracking and shearing of the teeth in use.

17 Claims, 4 Drawing Figures

TOOTHED BELT

TECHNICAL FIELD

This invention relates to toothed belts and in particular to toothed belts utilized for transmitting substantial forces.

BACKGROUND ART

In one form of drive belt, the longitudinally extending belt body is provided with a plurality of longitudinally spaced inner teeth. Such teeth are conventionally provided for a number of different purposes, such as for providing improved flexibility of the belt, permitting it to be utilized with relatively small diameter pulleys, and in certain applications, the teeth are utilized to provide a positive drive, such as drive synchronization is desirable.

A serious problem has arisen in connection with such toothed belts in that the teeth are subjected to relatively high transmissive stresses which tend to cause cracking and shearing of the teeth relative to the belt body. Such deterioration is aggravated by load conditions, such as high speed operation, heavy loading forces, subjection to relatively high temperatures, and subjection to moisture and flooding conditions.

One attempted solution to the vexatious cracking and shearing problem has been to provide a fabric cloth of wooly processed polyamide fibers, or a woven cloth and knit cloth of low oriented polyester fibers, with an elongation of more than 80% as a surface fabric on the toothed portion of the belt. It has been found, however, that such cloths tend to become fatigued and worn, and as a result of the deterioration thereof, fail to prevent the shearing and cracking of the teeth resulting from the repeated engagement of the teeth with the toothed pulleys in the use of the belt. Such deterioration has been found to have been aggravated by the low hydrolysis resistance thereof where the belt is subjected to moisture or flooding in use, and also to be aggravated by the subjection of the thusly fabric-coated belt to high temperatures.

Thus, the fabric-covered toothed belts of the prior art have not had satisfactory long troublefree life and the vexatious problem of cracking and shearing has not been heretofore satisfactorily resolved.

DISCLOSURE OF INVENTION

The present invention comprehends an improved fabric-covered toothed belt which eliminates the problems of the prior art toothed belt in a novel and simple manner and provides a long, troublefree life by providing high resistance to cracking and shearing of the teeth.

More specifically, the present invention comprehends the provision of such an improved toothed belt wherein a woven cloth is provided on the teeth which is formed of yarns of polyamide fibers having an ultimate viscosity of greater than approximately 1.30.

It has been unexpectedly found that the use of such a high ultimate viscosity fiber cloth provides highly improved wear resistance, heat resistance, and hydrolysis resistance, thereby effectively avoiding the problems of the prior art belts as discussed above.

In the illustrated embodiment, the weft yarns of the cloth extending in the longitudinal direction of the belt are wooly processed so as to have increased elasticity.

The improved toothed belt of the present invention is extremely simple and economical of construction while yet unexpectedly providing substantially increased useful life of the toothed belt.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
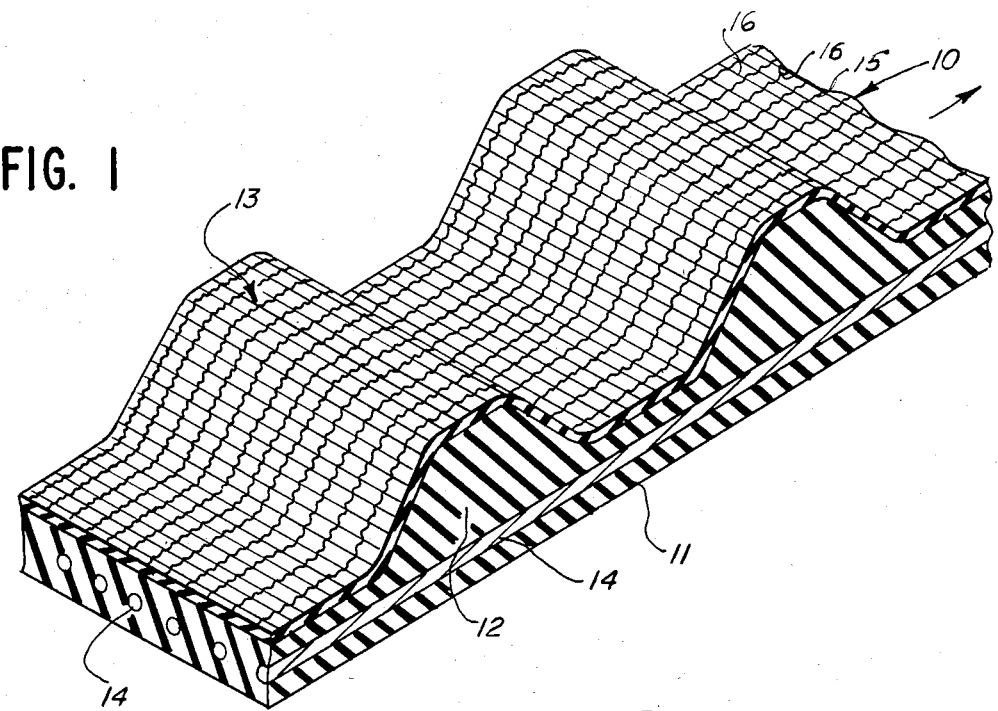
FIG. 1 is a fragmentary perspective view of a toothed belt embodying the invention.
Figure 2:
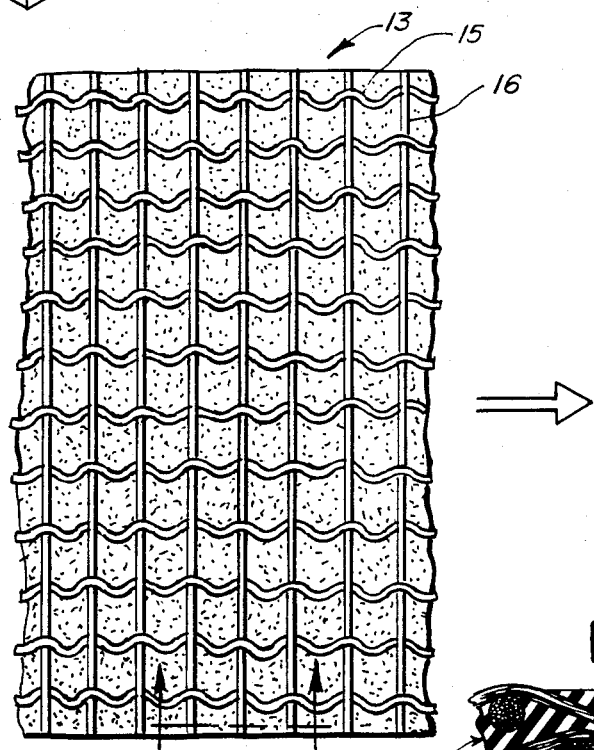
FIG. 2 is a fragmentary plan view thereof.
Figure 4:
FIG. 4 is a fragmentary vertical section of a modified form of the invention.
Figure 3:
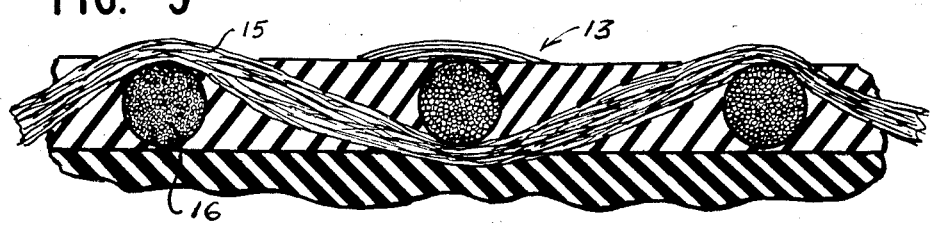
FIG. 3 is a fragmentary enlarged vertical section thereof.

In the illustrative embodiment of the invention as disclosed in the drawing, a toothed belt generally designated 10 embodying the invention is shown to include a body portion 11 provided with a plurality of longitudinally spaced teeth 12. As seen in FIG. 1, the teeth are overlaid with a fabric cloth generally designated 13. The invention comprehends provision of a novel cloth structure providing long, troublefree life of the belt by minimizing cracking and shearing of the teeth relative to the body 11.

As further illustrated in FIG. 1, belt body 11 is provided with a plurality of tensile cords 14 extending longitudinally of the belt at the pitch line thereof. The tensile cords comprise cords having low elongation and high strength, and illustratively, may be formed of glass fibers, carbon fibers, aromatic polyamide fibers, etc. The tensile cords are treated with an isocyanate compound, and a resorcinol-formalin-latex liquid so as to have improved bonding to the embedding rubber body 11.

The rubber body illustratively may be formed of one or more rubbers, such as chloroprene rubber, butyl rubber, nitrile butadiene rubber, ethylene propylene rubber, epichlorohydrin rubber, chlorosulfonate polyethylene rubber, etc.

The teeth 12, in the illustrated embodiment, are formed of rubber similar to that of the body 11, and as shown, may be integrally formed therewith.

As indicated above, the invention comprehends the provision of an improved fabric 13 covering teeth 12 providing high wear resistance, heat resistance, and hydrolysis resistance. The illustrated fabric is a woven canvas fabric having weft yarns 15 and warp yarns 16. The weft yarns 15 comprise wooly processed yarns providing increased elasticity.

The invention comprehends the forming of yarns 15 and 16 of a polyamide synthetic resin having an ultimate viscosity of greater than approximately 1.30. More specifically, the ultimate viscosity ($\eta$) is directly related to the molecular solution viscosity, the solvent viscosity, and the molecular concentration by the following formula:

$$(\eta) = \lim_{c \to 0} \left( \frac{\eta_{sp}}{c} \right) = \lim_{c \to 0} \frac{\eta - \eta_o}{\eta_o c}$$

wherein $\eta$ = the molecular solution viscosity $\eta_o$ = solvent viscosity c = molecular concentration (g. of solute/dl. of solvent)

$\eta sp = (\eta - \eta_o)/\eta_o$

As indicated above, the invention comprehends that the ultimate viscosity ($\eta$) be greater than approximately 1.30. It has been found that the use of such a high ultimate viscosity fiber in the tooth covering cloth provides unexpectedly high resistance to wear, fatigue, and deterioration of the cloth with improved resistance to heat and hydrolysis in providing a long, troublefree life to the belt construction.

In one toothed belt manufactured in accordance with the invention, the body and teeth were covered with fibers having weft yarns formed of nylon having an ultimate viscosity of 1.35. A similar belt was formed utilizing a tooth covering cloth having yarns formed of nylon having an ultimate viscosity of 1.02. As shown in the attached Table 1, the two belts manufactured in accordance with the present invention showed substantial superiority over the conventional belt in the resistance to shear.

Toothed belts similar to those in Table 1 were put into boiling water for three hours and subjected to a shearing force with the results thereof being shown in Table 2. As shown, the belts of the present invention showed substantial superiority over the conventional belt construction.

Belts similar to those of Table 1 were subjected to a running test carried out in an atmosphere of 100° C., with an applied load of 7 hp on the drive side, at 2,200 rpm, and the results thereof are illustrated in Table 3.

As shown by the above Tables, the toothed belt of the present invention provides unexpectedly improved performance and long life in resisting shearing forces under adverse conditions, such as high temperature and moisture.

In carrying out the invention, it is preferred that the wooly processed yarn be utilized only as either the warp or weft of the cloth and utilized as the yarn extending parallel to the longitudinal extent of the belt. The cloth, in the illustrated embodiment, comprises a canvas cloth which may selectively be a plain weave cloth, a twill weave cloth, a satin weave cloth, or a combination weave cloth, as desired. Preferably, the cloth is rubber-coated as discussed above for improved bonding thereof to the rubber of the belt, teeth and body.

In forming the belt, conventional methods of manufacture may be utilized, such as wherein the cloth 13 is firstly laid on a toothed cylindrical mold, the tensile cords 14 were helically wound thereabout, and an overlying unvulcanized rubber sheet wound over the tensile cords. The mold was then closed and heated with suitable pressure applied to forcibly urge the rubber into the toothed drum to provide an integral adhesion of the teeth to the belt body 11.

In carrying out the testing of the thusly formed belt, the belt was clamped in a chuck under a pressure of approximately 25 kg cm/in and a tension force applied to the body of the belt of approximately 50 mm/min.

The belt construction of the present invention is extremely simple and economical while yet providing the highly desirable features discussed above.

The foregoing disclosure of specific embodiments is illustrative of the broad inventive concepts comprehended by the invention.

TABLE 1

|  | Belt with Conventional Nylon Cloth | #1 Belt with Cloth of Invention | #2 Belt with Cloth of Invention |
|---|---|---|---|
| Cloth | $\eta = 1.02$ 210/1 × 50/4 100 × 150/5 cm | $\eta = 1.35$ 210/1 × 50/4 100 × 150/5 cm | $\eta = 1.56$ 210/1 × 50/4 100 × 150/5 cm |
| Force to Shear (kg) | 140–160 | 170–185 | 180–200 |

TABLE 2

|  | Belt with Conventional Nylon Cloth | #1 Belt with Cloth of Invention | #2 Belt with Cloth of Invention |
|---|---|---|---|
| Force to Shear (kg) | 95–120 | 145–160 | 170–185 |

TABLE 3

|  | Belt with Conventional Nylon Cloth | #1 Belt with Cloth of Invention | #2 Belt with Cloth of Ivention |
|---|---|---|---|
| Belt Life (hrs) Before Cutting | 120 | 350 | .450 |

We claim:

1. In a toothed belt having longitudinally spaced teeth and defining a pitch line, the improvement comprising a fabric adhered to the belt on said teeth including warp and weft yarns, said weft yarns having a configuration providing a preselected elasticity and being formed of polyamide synthetic resin having a limiting viscosity of greater than approximately 1.30.

2. The toothed belt of claim 1 wherein the belt includes tensile cords extending longitudinally of the belt at the pitch line thereof.

3. The toothed belt of claim 1 wherein said fabric comprises a canvas fabric.

4. The toothed belt of claim 1 wherein said fabric comprises woven fabric.

5. The toothed belt of claim 1 wherein said fabric comprises woven fabric having a plain weave.

6. The toothed belt of claim 1 wherein said fabric comprises woven fabric having a twill weave.

7. The toothed belt of claim 1 wherein said fabric comprises woven faric having a satin weave.

8. The toothed belt of claim 1 wherein said fabric comprises a woven fabric having a combination weave.

9. The toothed belt of claim 1 wherein said belt is formed of rubber.

10. The toothed belt of claim 1 wherein said fabric comprises a single layer.

11. The toothed belt of claim 1 wherein said fabric comprises a plurality of similar layers.

12. In a toothed belt defining a pitch line and having a rubber body and longitudinally spaced rubber teeth joined to the body, the improvement comprising a fabric adhered to the belt on said teeth including warp and weft yarns, said weft yarns being formed of polyamide synthetic resin having a limiting viscosity of greater than approximately 1.30 and comprising wooly processed yarns extending longitudinally of the belt.

13. The toothed belt of claim 12 wherein said teeth are formed integrally with said body.

14. The toothed belt of claim 12 wherein said fabric is rubber coated.

15. The toothed belt of claim 12 wherein said fabric comprises a plurality of layers.

16. The toothed belt of claim 12 wherein said fabric comprises a woven fabric.

17. The toothed belt of claim 12 wherein said body is provided with longitudinally extending tensile cords at the pitch line of the belt.

* * * * *